United States Patent Office 3,355,101
Patented Nov. 28, 1967

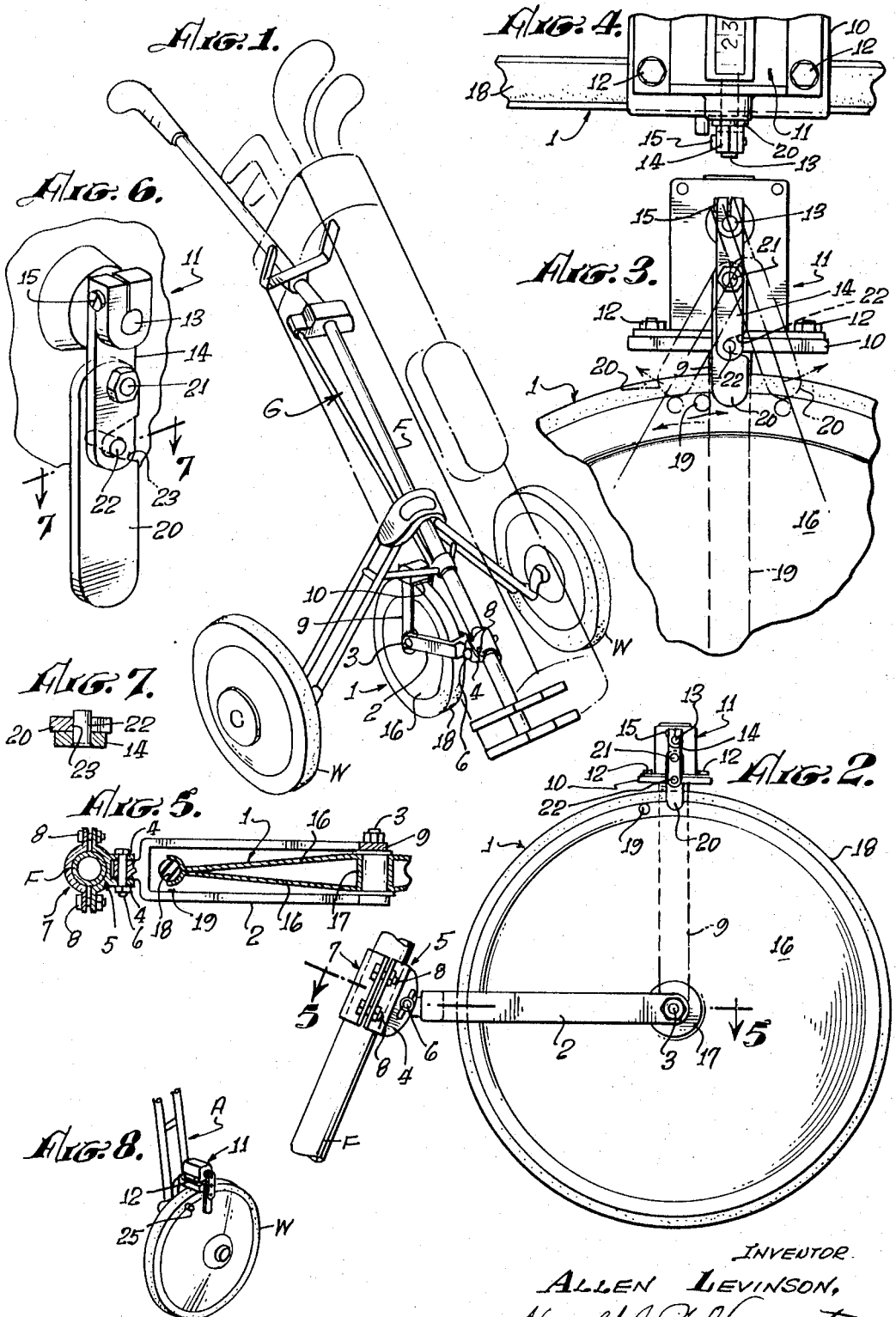

3,355,101
ODOMETER FOR GOLF CART
Allen Levinson, 1550 Lake St., Glendale, Calif. 91201
Filed May 23, 1966, Ser. No. 552,035
3 Claims. (Cl. 235—95)

This invention relates to distance measurement and more particularly to an odometer attachable to a golf cart whereby a golfer may ascertain accurately the length of shots as an incident to going to the point at which the ball landed for the succeeding shot.

The principal objects of the invention are to provide an odometer means including a distance measuring wheel which is attachable to a golf cart, or, alternatively, to mount an odometer mechanism for actuation by a lug on an existing wheel of a golf cart for the purpose of ascertaining the distance traversed by the golf cart; to provide means in either or both of said alternative principal objects for preventing retrograde action of the metering means; and to provide a device in which the foregoing objectives are realized in practice, which is readily applicable to existing golf carts, which is simple in construction, economical to manufacture, and reliable for its intended purpose.

With the foregoing objects in view, together with such additional objects and advantages as may subsequently appear, the invention resides in the parts, and in the construction, combination and arrangement of parts described, by way of example, in the following specification of certain presently preferred embodiments of the invention, reference being had to the accompanying drawings which form a part of said specification and in which drawings:

FIG. 1 is a perspective view of a typical golf cart showing the attachment thereto of a first presently preferred embodiment of the invention, FIG. 2 is an enlarged side elevational end view of the said first embodiment of the invention as viewed from the side opposite that shown in FIG. 1, FIG. 3 is a further enlarged, fragmentary side elevation showing details of the counter actuating means, FIG. 4 is a fragmentary top plan view of FIG. 3, FIG. 5 is a fragmentary sectional view taken on the line 5—5 of FIG. 2, FIG. 6 is a further enlarged, perspective view of the counter driving means, FIG. 7 is a sectional view taken on the line 7—7 of FIG. 6, and FIG. 8 is a perspective view showing a second embodiment of the invention.

Referring first to FIGS. 1–7, the first embodiment of the invention comprises a wheel 1 having a circumference equal to a unit of linear measurement, e.g., one yard, said wheel being freely rotatably mounted in a supporting yoke 2 by an axle bolt means 3. The yoke 2 exteriorly of the wheel is freely pivotally secured between the spaced arms 4, 4 of a mounting clamp member 5 by a bolt 6 which extends parallel to the axle bolt means 3. The clamp member 5 and a complementary clamp member 6 are adapted to be secured by bolts 8, 8 to surround and grip the central frame member F of a golf cart G so that the wheel 1 is positioned parallel to the golf cart wheels W, W.

One arm of the yoke 2 includes a vertically disposed arm 9 which extends from the distal end of the arm upwardly and terminates in a flat, horizontal mounting pad portion 10 disposed over the periphery of the wheel 1 and a ratchet-type counting mechanism 11 is secured to the upper surface of the mounting pad 10 by bolt means 12, the axis of the operating shaft 13 of said counting mechanism being disposed parallel to the axis of the wheel 1. The outer end of the shaft 13 overhangs the edge of the mounting pad 10 which is remote from the arm 9 and carries a depending actuating arm 14 secured thereto by a clamp screw 15, said arm being disposed in a plane parallel to but disposed outwardly from the side of the wheel 1 which is remote from the arm 9.

The wheel may be of any construction and is here shown as formed from a pair of plastic or metal disks 16, 16 spaced apart at the center by an interposed hub 17 and being united inwardly of the outer edges thereof with the said outer edges thence being outwardly flared to form a peripheral channel in which a rubber tire 18 is mounted. The disk 16 which is remote from the arm 9 carries a pin 19 projecting laterally from the edge thereof and the actuating arm 14 of the counting mechanism carries a detent member 20 freely pivoted to an intermediate portion thereof by a bolt means 21 which extends parallel to the shaft 13, said detent member extending downwardly with the distal end thereof disposed in the excursion path of the end 19. The distal end of the actuating arm 14 carries a stop pin 22 projecting from the side thereof on which the detent member 20 is mounted and the detent member 20 is provided with a complementary notch 23 which embraces the pin 22.

Having reference to FIG. 3, it will be noted that upon the clockwise rotation of the wheel 1, the pin 19 will engage the end of the detent member 20 and cause it to engage the pin 22 and thus swing the arm 14 and shaft 13 through an increment of counterclockwise movement, it being understood that the counting mechanism is a standard article of commerce and that the shaft 13 is spring biased to return to its starting position, the increment of moving thus imparted being sufficient to move the counting mechanism to record one digit of movement or as applied to the present invention to register travel of one yard. Accordingly, each revolution of the wheel 1 clockwise as viewed in FIGS. 2 and 3, or counterclockwise as viewed in FIG. 1, will cause the counting mechanism to register travel of one yard. If the wheel is rotated in the opposite direction, the detent member 20 will merely swing on its pivot bolt 21 away from the pin 22 and thus will not impart any movement to the counting mechanism. Moreover, this detent may be placed on the actuating arm with the notch thereof open to the left as viewed in FIG. 3, if desired, whereupon the counter would register with respect to the golf cart being pushed instead of pulled, having reference to FIG. 1. The clamp by which the device is attached to the golf cart may be attached at any elevation on the golf cart frame member F which will position the window through the window through which the dial means of the counting mechanism is viewed convenient for observation and the pivotal mounting of the yoke permits the wheel 1 to follow the ground traversed regardless of rough spots or the like encountered by the golf cart wheels. Additionally, of course, this pivotal mounting permits the golf cart to be tilted about the axis of its wheels incident to being pulled or pushed along the golf course or to occupy its position of rest as shown in FIG. 1.

FIG. 8 shows a modified form of the invention in which the counting mechanism is mounted on a bracket 24 which is secured to one of the arms A on which one of the golf cart wheels W is mounted, the wheel being provided with a laterally projecting pin 25 for actuating the counting mechanism in the same manner as previously described. Since golf cart wheels are normally of less than one yard in circumference, the counting mechanism may be appropriately geared so that each actuation of the counting mechanism by rotation of the wheel W advances the counting means the appropriate distance to be read in yards on the counting mechanism. Alternately, of course, the golf cart may be provided with wheels which are one yard in circumference.

The fact that the meter operating means in both embodiments is effective to operate the meter only in one direction of rotation of the ground engaging wheel which carries the operating pin (19 or 25) has a special advantage. Because of this, the cart may be moved either in a direction in which the meter is operated or in a direction in which the meter is not operated. For example, assume that the yardage of a shot has been determined by moving the cart to the point at which the ball lies with the meter operating wheel brought in close adjacency to the ball. By moving the cart away from the spot occupied by the ball in a direction which does not operate the meter, the reading of the meter remains undisturbed. Then at the next shot, and still moving the cart in the direction which does not operate the meter, the meter operating wheel can be positioned at the spot from which the ball is driven and the cart then moved to the end of the yardage to be measured in a meter operating direction. No changes need be made in the apparatus and no reverse readings are effected by moving the cart in a reverse direction. The actual yardage can be obtained and the only care needed to be observed is that when the meter is not to be operated, the cart is either pushed or pulled dependent upon how the meter operating lever or detent is positioned with respect to the operating pin on the ground engaging wheel.

Thus there has been provided an odometer means which may be readily attached to a golf cart so that a player may, without extra effort, ascertain the actual yardage achieved by each shot. The device is of simple construction and is capable of ready attachment to the golf cart and does not interfere with the normal use of the cart.

While in the foregoing specification, there have been disclosed by way of example certain presently preferred embodiments of the invention, the invention is not to be deemed to be limited to the precise details thus disclosed by way of example and it will be understood that the invention includes as well all such changes and modifications in the parts, and in the construction, combination and arrangement of parts as shall come within the purview of the appended claims.

I claim:

1. An odometer means for a golf cart including a pair of wheels by which it is supported, said odometer means comprising a ground engaging wheel associated with the golf cart rotatable as the golf cart is propelled along the ground, a wheel revolution recording means constituting a meter having operating means disposed in close proximity to said wheel, and means carried by said wheel momentarily actuating said operating means at each revolution of said wheel in one direction of rotation thereof only, said meter having indicating means so calibrated to the circumference of said wheel as to indicate the extent of propulsion of the golf cart causing rotation of said wheel in said one direction in terms of linear measurement, said wheel being mounted for rotation on a support axle carried by a frame structure having means affording detachable connection with a member of a golf cart and said detachable connection with the golf cart frame including pivot means disposed axially parallel to axis of said wheel and the axial line of the golf cart wheels affording independent accommodation of said wheel to the surface of the ground traversed thereby.

2. A golf cart odometer means including a pair of wheels by which it is supported, said odometer means comprising a ground engaging wheel associated with the golf cart and rotatable as the golf cart is propelled along the ground, a wheel revolution recording means constituting a meter having operating means disposed in close proximity to said wheel, and means carried by said wheel momentarily actuating said operating means at each revolution of said wheel in one direction of rotation thereof only, said meter having indicating means so calibrated to the circumference of said wheel as to indicate the extent of propulsion of the golf cart causing rotation of said wheel in said one direction in terms of linear measurement, said wheel is provided with a pin projecting laterally from a side surface thereof adjacent the periphery of the wheel and in which said meter includes actuating ratchet means operated by an oscillatable operating shaft carrying a radially extending actuation arm means projecting into the excursion path of said pin for momentary displacement by said pin as said wheel is caused to rotate, said actuating arm means including an arm component fixed to said shaft and a detent component pivotally mounted on said arm component for movement about an axis parallel to the axis of said shaft and projecting into the path of excursion of said pin, and said arm means, additionally including stop means operative to prevent pivotal movement of said detent on said mounting thereof in one direction whereby said detent and arm components move as a unit in response to excursion of said pin in one direction and said detent moves independently on its pivotal mounting in response to excursion of said pin in the opposite direction.

3. A golf cart odometer means as claimed in claim 2 in which said means for pivotally mounting said detent component on said arm component and said stop means are so constructed and arranged that said detent component may be mounted optionally on said arm component to respond to clockwise or counterclockwise rotation of said wheel.

References Cited

UNITED STATES PATENTS

| | | | |
|---|---|---|---|
| 2,711,027 | 6/1955 | Williamson | 235—95 |
| 2,724,361 | 11/1955 | Coffin | 235—95 |
| 2,742,229 | 4/1956 | Hacking | 235—95 |
| 2,766,935 | 10/1956 | Klien | 235—95 |
| 3,196,545 | 6/1965 | Zell et al. | 235—95 |
| 3,202,353 | 8/1965 | Nowak et al. | 235—95 |
| 3,250,466 | 5/1966 | Tomlinson | 235—95 |

RICHARD B. WILKINSON, *Primary Examiner.*

STANLEY A. WAL, *Assistant Examiner.*